June 1, 1965

R. T. CHEW 3,186,188

CLOSE-UP COUPLING FOR MOTOR-DRIVEN UNIT

Filed Aug. 20, 1962

INVENTOR:
ROY T. CHEW
BY
ATT'YS

June 1, 1965 R. T. CHEW 3,186,188
CLOSE-UP COUPLING FOR MOTOR-DRIVEN UNIT
Filed Aug. 20, 1962 2 Sheets-Sheet 2
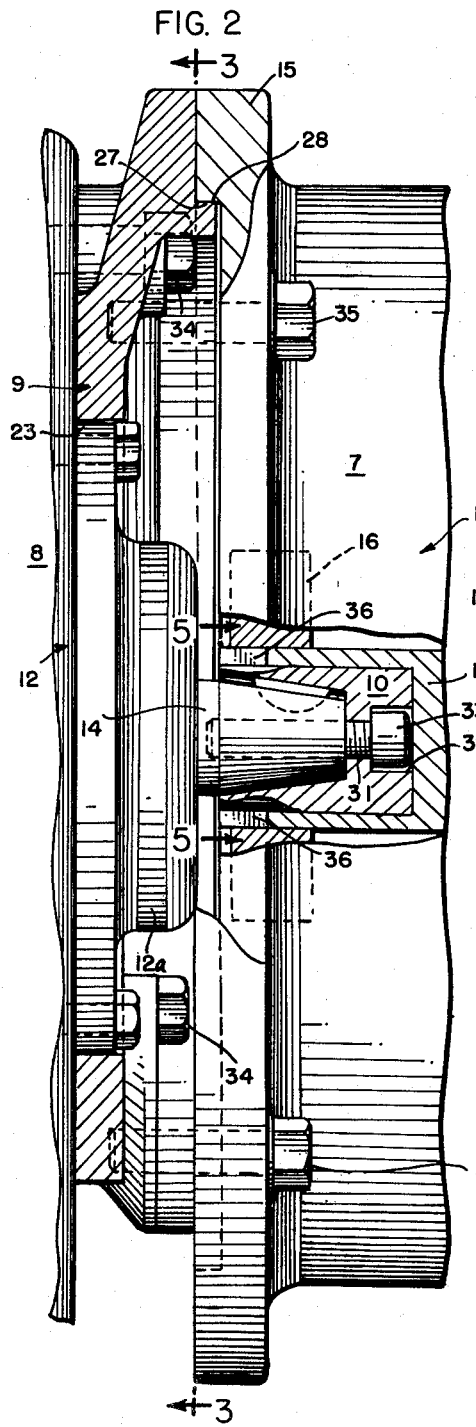
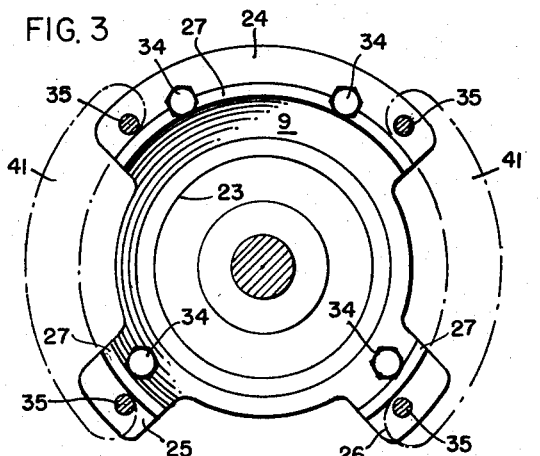
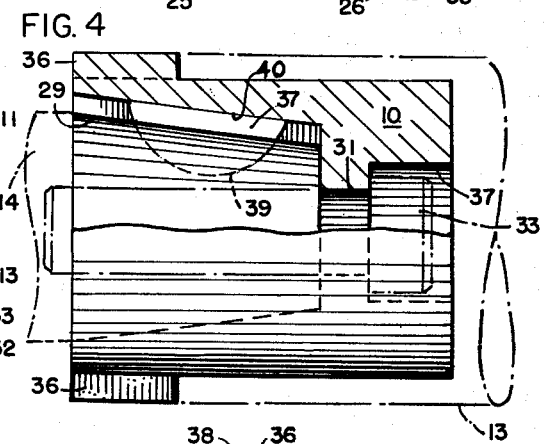
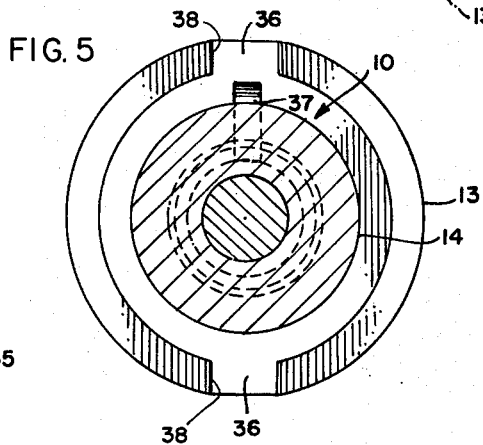
INVENTOR:
ROY T. CHEW
BY
ATT'YS United States Patent Office 3,186,188
Patented June 1, 1965

3,186,188
CLOSE-UP COUPLING FOR MOTOR-DRIVEN UNIT
Roy T. Chew, 11322 S. Michigan Ave., Chicago 28, Ill.
Filed Aug. 20, 1962, Ser. No. 217,846
6 Claims. (Cl. 64—4)

This invention relates to a close-up coupling for connecting a motor driving unit to a driven unit.

The main objects of this invention are to provide an improved form of close-up coupling for the direct connection of a motor driving unit to a driven unit; to provide an improved form of coupling of this kind especially adapted for use with a flange-mounted motor-driving unit; to provide an improved form of bracket and keyed-plug-element combination for the telescopic connection of the axially-aligned shafts of a flange mounted motor driving unit and a driven unit; and to provide an improved coupling of this kind especially adapted for use to connect a flange mounted motor unit with the standard shaft extension of a driven unit such as a refrigeration compressor.

A specific embodiment of this invention is shown in the accompanying drawings in which;

FIG. 2 is an enlarged, fragmentary side view, partly in section and partly in elevation, of the close-up coupling connecting the units shown in FIG. 1;

FIG. 3 is a somewhat reduced end view of the bracket element of the close-up coupling as viewed from the plane of the line 3—3 of FIG. 1;

FIG. 4 is an enlarged, fragmentary, partly-sectional, partly-elevational side view of the element which effects the telescopic connection of the aligned shafts of the driving and driven units; and FIG. 5 is a left-hand end view of the element shown in FIG. 4.

Figure 1:
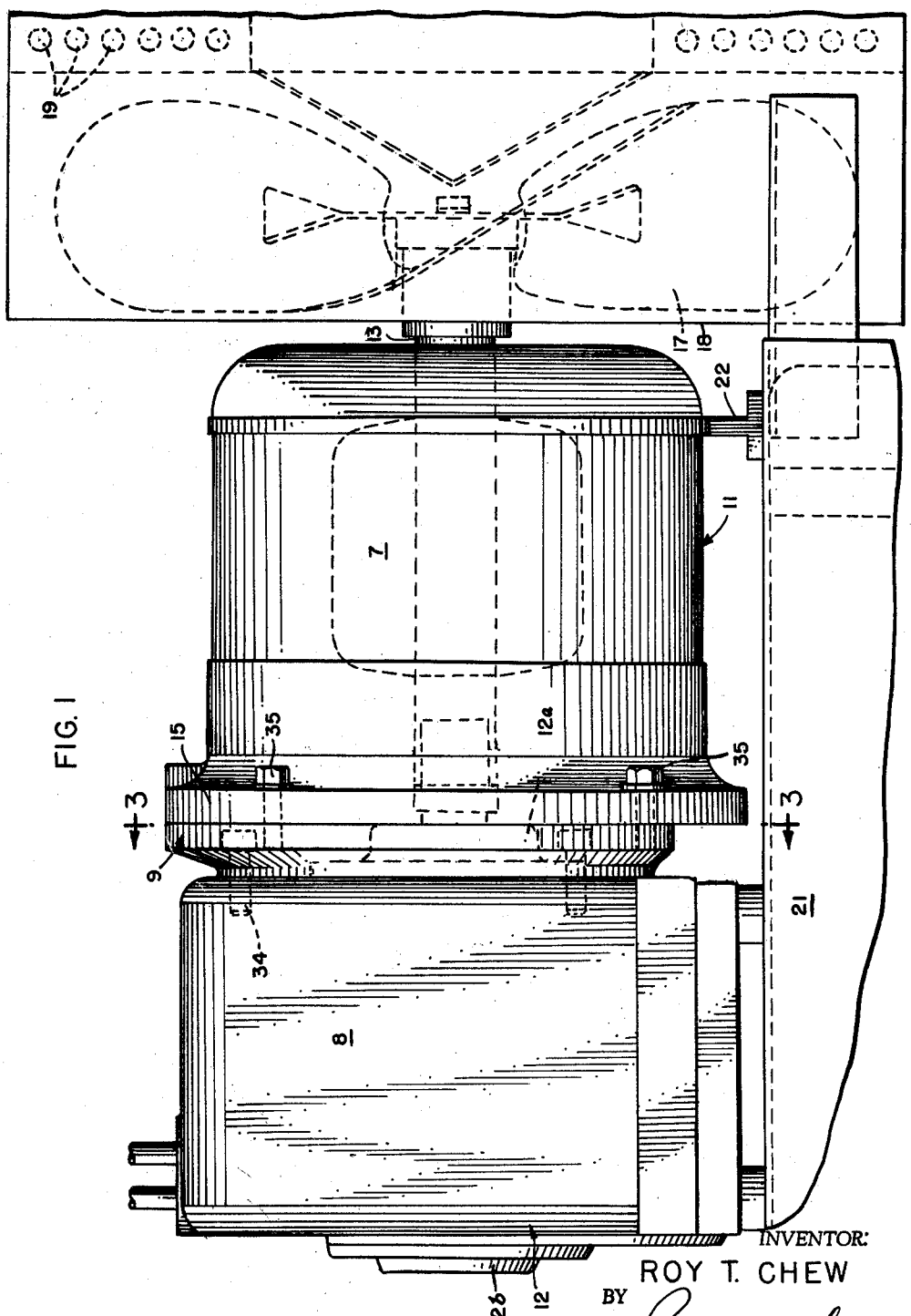
FIGURE 1 is a side view of an axially-aligned motor driving unit and a refrigeration compressor driven unit connected by a close-up coupling constructed in accordance with this invention.

The essential concept of this invention, for the close-up coupling of a motor-driving unit and a driven unit, is to provide an adapter for the standard shaft extension of the driven unit, arranged for non-rotative telescoping reception into an axial bore formed in the shaft of a flange mounted driving unit, and to provide a mounting bracket for attaching the flange of the driving unit to the body of the driven unit.

A close-up coupling, for effecting the unitary operation of a driving unit 7 and a driven unit 8, embodying the foregoing concept, comprises the primary elements 9 and 10 which, with the hereinafter identified connectors and keys, secure the unit housings 11 and 12 in juxtaposed relationship to effect an axially-aligned telescopic connection of the shafts 13 and 14 of the respective units 7 and 8. The driving units 7 and 8, as here shown, are associated for use in a refrigerating system and comprise an electric motor and a compressor, respectively.

The motor unit 7 is a conventional flange-mounted type wherein the supporting base or flange 15 is integrated with the motor housing 11 to provide for attaching the motor unit directly onto a supporting structure. The motor shaft 13 is supported in the housing 11 on conventional anti-friction bearings, one of which is indicated in phantom outline 16 in FIG. 2. The base end of the shaft 13 is recessed by an axial bore to receive the hereinafter-described primary element 10. At its opposite end the shaft 13 projects from the motor housing and mounts a fan 17 arranged in a shroud 18 which extends from a conventional doughnut type condenser 19.

The driven unit 8 herein shown is a compressor. It may be of any of several conventional units or it may be a unit such as shown and described in co-pending application Serial No. 209,945. The housing 12 has the usual end caps 12a and 12b bolted to the opposite ends and mounting bearings for the driven shaft 14. This shaft 14 extends outwardly through the end cap 12a and often is tapered, as shown in FIGS. 2 and 3. As shown, the compressor unit 8 is mounted on a suitable support 21 with which is associated a liquid receiver for the refrigerating system. The support 21 also provides for the mounting of the fan shroud 18 and condenser 19 thereon. A post 22 is shown interposed between the fan-end of the motor housing 11 and the support 21 to establish the greater rigidity for the unit 7.

The primary element 9 here is shown as a mounting bracket of annulus form with a central opening 23 and a quadrant-shaped, axially-offset perimetrical extension 24 at one side and a pair of circumferentially-spaced, axially-offset ears 25 and 26 diametrically opposed to the respective ends of the quadrant-shaped extension 24. The opening 23 would be dimensioned to receive the hub on the end cap 12a. The diameter of the peripheral edges of the extension 24 and the ears 25 and 26 is the same as the peripheral diameter of the mounting flange 15 of the unit housing 11 (FIGS. 1 and 2). Inwardly of their peripheral edges the extension 24 and each of the ears 25 and 26 are formed with rims 27 for seating against a shoulder 28 formed by the recessed central portion of the motor flange 15 (FIG. 2). The interfitting of these rims 27 with the ledge 28 tends to insure the unit housings 11 and 12 being concentrically positioned with respect to the aligned axes of the shafts 13 and 14. The opposed and abutting peripheries of the rims 27 and the ledge 28 have a common axis so that in their interfitting relationship, as shown in FIG. 2, the driving unit 7 and driven unit 8 may be rotatively adjusted to assume any desired relative angular positioning. The extension 24, near its ends, and the ears 25 and 26 are apertured for the insertion of the hereinafter-described connectors for anchoring the bracket element 9 to and between the respective unit housings 11 and 12.

The primary element 10 is an adapter for the driven unit shaft extension 14 and here is shown as a cylindrical plug. This plug is externally dimensioned to telescopically fit into the recessed end of the shaft 13 of the driving unit 7 and is taper-bored at 29 to telescopically set over the conventionally tapered end of the shaft 14. Also, the element 10, in the end opposed to the tapered bore 29, is concentrically drilled and counterbored to form a hole 31 and a socket 32 for the reception of the shank and head, respectively, of a locking bolt 33 whereby the plug element 10 is secured in tight telescopic embracement on the tapered end of the shaft 14.

The hereinbefore-mentioned connectors, whereby the bracket element 9 is secured to the housings 11 and 12, comprise two sets of bolts 34 and 35. The one set comprises four connector bolts 34 which extend through respective apertures in the bracket extension 24 and the ears 25 and 26 (FIG. 3) and screw into suitable tapped holes in the opposed end of the housing 12 (FIG. 2). This attaches the bracket 9 to the driven unit 8. The other connector bolts 35 extend through angularly spaced apertures in the motor flange 15 and screw into respective tapped holes located in the extension 24 and the ears 25 and 26 of the bracket element 9 (FIG. 3).

Keys 36 and 37 secure the adapter element 10 in fixed non-rotative position relative to the shafts 13 and 14. The key 36 is in the form of diametrically opposite radial lugs (FIGS. 2 and 4) integral with the element 10 and extending radially outward from the taper-bored end of the element 10 to seat in diametrically opposed notches 38 in the adjacent inner end of the shaft 13 (FIG. 5). The key 37, of the Woodruff type, is seated in an arcuate groove 39 in the tapered end of the shaft 14 and in a slot 40 in the tape-bored end of the plug element 10 (FIGS. 2 and 4).

When the above-described close-up coupling is used, as herein shown, for connecting a motor or driving unit 7, arranged adjacent a condenser 19, to a driven compressor unit 8 the cooling of the compressor may be facilitated by the interposition of a pair of arcuate-shaped air-deflecting baffles or scoops 41 between the bracket element 9 and either of the units 7 or 8 as indicated by the dot-dash outline in FIG. 3. Such baffles would have apertured ears adjacent their respective ends to accommodate the connector bolts 35 and thus be interposed between the bracket element 9 and the motor mounting flange 15. The faces of the baffles 41 facing the fan 17 will be transversely curved to extend axially beyond the flange 15 and thus tend to deflect the rearwardly-directed air-flow from the fan inwardly against and cross the forward end of the unit 8 for discharge vertically downward between the ears 25 and 26. The use of such scoops or baffles 41 would be expedient in a situation where the compressor unit 8 is being operated for producing especially low temperatures, hence, resulting in excessive heating of the compressor.

A close-up coupling, constructed in accordance with this invention, would be used in the following manner:

Holes for the set of connector bolts 34 would be drilled and tapped in the end of the driven unit housing 8 to register with the inner set of holes in the bracket extension segment 24 and the ears 25 and 26. Also, holes would be drilled in the mounting flange or base 15 of the motor housing 11 to register with the tapped outer set of holes in the bracket member for the motor mounting bolts 35. Also, the end of the shaft 13 would be cylindrically recessed and radially notched to receive the adapter element 10.

The plug element 10 then would be set over the tapered end of the shaft 14, with the key 37 in place, and secured in position thereon by the locking bolt 33. Next, the bracket element 9 would be secured in place on the housing 12 by the set of connector bolts 34.

Thereupon, the motor-driving unit 7 would have the recessed end of the shaft 13 seated over the plug element 10 as the flange base 15 is fitted into registration with the bracket element 9 (FIG. 2). Thus positioned the notches 38 would have the key lugs 36 seated therein and rotatively connect the plug element 10 to the shaft 13. The set of connector bolts 35 then would be inserted through the drilled holes in the flange base 15 and screwed into the outer set of tapped holes in the bracket element 9.

The main advantages of this invention reside in its ready adaptability to many kinds of driven devices whereby the close coupling capability of flange mounted motors can more fully be utilized; in the fact that the improved coupling permits the use, with a flange mounted motor, of the standard shaft extension of the driven device thereby permitting the use of either a pulley or a directly connected motor without modification of the driven device; in the very simple and relatively low cost construction of the improved coupling elements; and in the fact that the improved coupling can be standardized for a particular driven device and yet accept the full range of motor sizes (i.e. 1 to 5 H.P.) having common dimensions for the mounting flange.

Although but one specific embodiment of this invention has been herein shown and described it will be understood that details of the structure shown may be altered or omitted without departing from the spirit of the invention as defined by the following claims.

I claim:

1. A close-up coupling for the connection of the aligned shafts of juxtaposed driving and driven units, the end of one of said shafts being axially recessed to receive an end portion of the other shaft, said coupling comprising
    (a) a bracket for interposition between the unit housings for connecting one unit housing to the other with the unit shafts in telescoping relation,
    (b) a member for concentric telescoping interposition between the opposed ends of the telescoped shafts,
    (c) connectors for anchoring the bracket rigidly to the two unit housings, and
    (d) keys drivingly connecting the said member to the respective unit shafts.

2. A close-up coupling as set forth in claim 1 wherein the said member is cylindrical and externally dimensioned to seat in the recess in the end of the one shaft and is internally bored to receive the end of the other shaft.

3. A close-up coupling as defined in claim 1 wherein the end of the driving shaft is cylindrically recessed and said member is externally dimensioned to seat in the recess, and wherein the said member is internally bored to receive and seat the end of a tapered extension on the driven shaft.

4. A close-up coupling for the connection of the shafts of a driving unit and a driven unit comprising,
    (a) a bracket having apertures for the reception of connectors to secure the said units in juxtaposed position with the respective shafts axially aligned, one of said shafts having a cylindrical recess extending axially inward from its end,
    (b) a cylindrical member externally dimensioned to seat in the recessed end of the said one shaft and being bored axially to telescopically receive the end of the other shaft,
    (c) a bolt mounted in the cylindrical member and engaged in a threaded bore in the said other shaft to secure the said member thereto, and
    (d) keys for connecting the said member in non-rotative relationship with each of said shafts.

5. A close-up assembly of the class described comprising
    (a) a driving unit and a driven unit the shaft ends of which are shaped for telescopic axial engagement with each other,
    (b) a bracket secured to each of the unit housings and positioning the units with the said shafts in end to end telescoping relation,
    (c) an annular member concentrically disposed between and spanning the opposed ends of the telescoped shafts, and
    (d) keys drivingly connecting the said member with the respective shafts,
    (e) said member being externally dimensioned to seat in the end of one of said shafts and internally recessed to receive the end of the other shaft.

6. A close-up assembly of the class described comprising,
    (a) a motor driving unit of the flange-mounted type having the exposed end of the drive shaft axially recessed,
    (b) a driven unit having the end of its shaft outwardly of the housing of frustum shape and provided with a threaded hole extending inwardly from the exposed end thereof,
    (c) a connector member cylindrically shaped and telescopically seated in the recessed end of the driving unit shaft, said member having a frustum-shaped bore extending axially from the exposed end and telescopically seated over the end of the driven unit shaft,
    (d) a bolt extending axially through said member and threaded into the hole in the driven-unit shaft to secure said member on the driven-unit shaft, and
    (e) keys securing the said member in driving relationship with the shafts of the driving and driven units.

(References on following page)

References Cited by the Examiner
UNITED STATES PATENTS

| | | | |
|---|---|---|---|
| 1,259,132 | 3/18 | Ritz | 64—4 |
| 1,508,897 | 9/24 | Seaholm et al. | 64—6 |
| 1,629,949 | 5/27 | Caffarello | 64—4 |
| 1,947,796 | 2/34 | Radford | 64—4 |
| 2,150,347 | 3/39 | Sorensen | 230—58 |
| 2,365,146 | 12/44 | Wichorek | 64—23 X |
| 2,422,946 | 6/47 | Brittain | 64—1 |
| 2,846,140 | 8/58 | Kemper | 230—58 |

ROBERT C. RIORDON, *Primary Examiner.*